Figure 1:
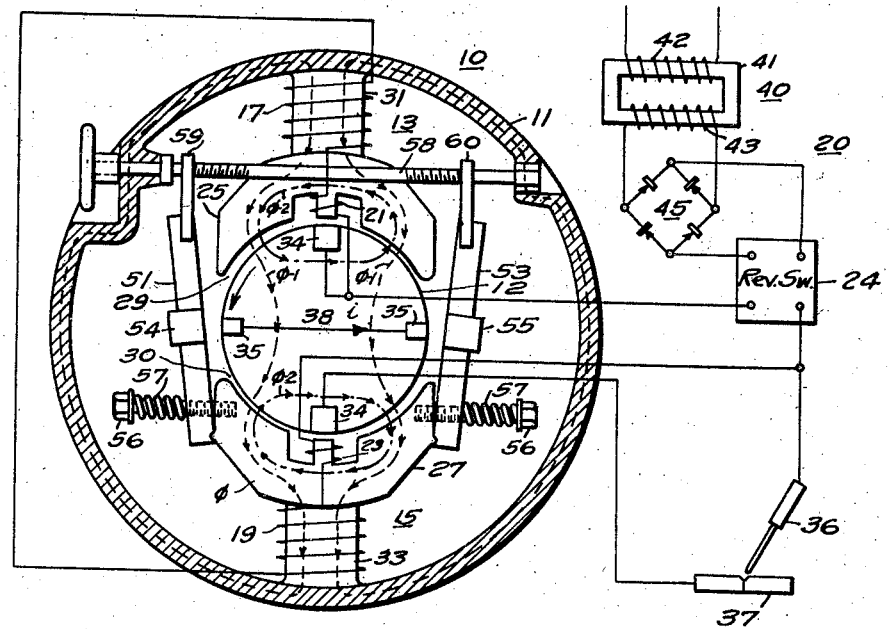

Dec. 26, 1939.  W. R. HARDING  2,184,766

CROSS-FIELD GENERATOR

Filed Nov. 27, 1937

WITNESSES:
E. A. McCloskey.
G. V. Giolma

INVENTOR
William R. Harding
BY
ATTORNEY

Patented Dec. 26, 1939

2,184,766

UNITED STATES PATENT OFFICE 2,184,766

CROSS-FIELD GENERATOR

William R. Harding, Pittsburgh, Pa., assignor to Westinghouse Electric & Manufacturing Company, East Pittsburgh, Pa., a corporation of Pennsylvania Application November 27, 1937, Serial No. 176,862

5 Claims. (Cl. 171—227)

My invention relates, generally, to generators, and it has particular reference to direct current generators of the cross-field type.

Through recent developments, generators of the cross-field type have come into wide use in the welding industry, particularly because of their flexibility of operation and substantially constant current characteristics. Since generators of this type rely mainly upon series-field windings for the production of the magnetic flux therein, their open circuit voltage, which must accordingly be generated by the residual magnetism of the field pole members, is substantially lower than that of generators of other types. It is, therefore, not uncommon, when the electrode of a welding generator of the cross-field type comes into contact with the electrode of a generator having a higher open circuit voltage, to have the residual polarity of the cross-field generator reversed, because of the circulating current which is forced through its series-field winding in the reverse direction by contact with the electrode of the higher voltage machine. Since it is essential in arc-welding to maintain the desired polarity of the welding electrode in order to secure satisfactory welds, further developments have been found necessary in connection with generators of the cross-field type, to ensure the terminal polarity of the generator being reestablished or maintained, even after an accidental reversal of the residual magnetism of the generator.

In general, polarity determining control systems for cross-field generators have utilized an external source in connection with a field winding of the generator for providing auxiliary excitation thereof, in order to fix the polarity of the residual magnetism of the field pole member and definitely determine the terminal polarity of the generator. Such systems, while performing effectively to both control and determine the terminal polarity of the generator, have, by increasing the flux through the field pole member, necessarily increased the circulating armature current induced thereby in the auxiliary brush circuit. In some instances, the increase of the circulating current in the auxiliary brush circuit has been of such extent as to cause undesirable sparking of the brushes when the generator is running without load, and adversely affect the stability of operation of the generator when running under load.

It is, therefore, generally an object of my invention to improve the commutation and stability of a generator of the field type having auxiliary field pole excitation.

More specifically, it is an object of my invention to utilize a differential in air gap reluctance in a generator of the cross-field type for preventing auxiliary excitation of a field pole winding from causing an increase in the no-load armature circulating current.

Another object of my invention is to provide uneven air gaps in a generator of the cross-field type having auxiliary polarity control field pole excitation for preventing an increase in the no-load magnetomotive force acting on a field pole member from increasing the effective air gap flux of the generator.

Still another object of my invention is to increase the air gap spacing in the direction of armature rotation, in a generator of the cross-field type having auxiliary polarity control field pole excitation, for decreasing the auxiliary brush armature current and improving the commutation and stability of the generator.

Other objects of the invention will, in part, be obvious, and, in part, appear hereinafter.

Figure 2:
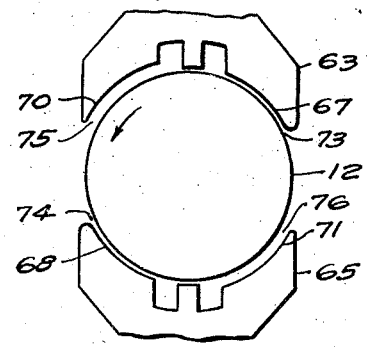

For a more complete understanding of the nature and scope of my invention, reference may be had to the following detailed description, taken in connection with the accompanying drawing, in which:

Figure 1 represents diagrammatically a preferred embodiment of my invention in connection with a generator of the cross-field type; and, Fig. 2 illustrates an alternative form of my invention as practiced with a generator of the cross-field type.

Referring to Fig. 1, the reference numeral 10 may denote generally a generator of the cross-field type comprising, a frame 11, an armature 12, and field pole members 13 and 15 having series field windings 17 and 19 and commutating field windings 21 and 23, respectively, positioned thereon. An external source of auxiliary excitation 20 may be connected with the series field windings 17 and 19 and the commutating field windings 21 and 23 of the generator for determining and controlling the terminal polarity thereof. A reversing switch 24 may be interposed between the source and the windings so that the polarity of the residual magnetism of the field pole members may be altered at will for reversing the terminal polarity of the generator.

In a preferred embodiment of my invention, the shoe portions 25 and 27 of the field pole members 13 and 15, respectively, may be disposed in such relation with armature 12 that the air gaps 29 and 30, respectively, are of increased magnetic reluctance in the direction of the rotation of the armature 12, which in this case is counter-clockwise, as indicated by the curved arrow.

Referring more particularly to Fig. 1, it may be seen that generator 10 is generally of the cross-field type, as disclosed in the pending application of John H. Blankenbuehler, Serial No. 26,871, assigned to the assignee of this application, and comprises a frame 11, which field pole members 13 and 15 positioned therein, comprising main body portions 31 and 33, respectively, about which are disposed series field windings 17 and 19, and enlarged shoe portions 25 and 27, adjacent to the armature. These shoe portions may be so disposed in relation to the armature 12 that the air gaps 29 and 30 which separate the shoe portions 25 and 27 therefrom, may, as shown, be of gradually increasing length radially, in the direction of armature rotation.

The armature 12 may, as herein shown, be provided with main brushes 34 and auxiliary brushes 35, in the usual manner of cross-field generators. The main brushes are disposed in connection with the series-field windings 17 and 19 and the commutating field windings 21 and 23, for connection to a load circuit, which comprises an electrode 36 and work 37. The auxiliary brushes 35 are normally connected together by a conductor 38, to provide a path for an armature circulating current which is induced therein when the armature conductors cut the residual flux of the field pole members, indicated by the dotted line φ—1. This circulating armature current in turn produces a cross-field magnetic flux which traverses the shoe portions 25 and 27, respectively, and also a portion of the armature as shown by the dotted line φ—2, and induces a voltage between the main brushes 34.

As shown in this instance, the auxiliary excitation source 20 may comprise a transformer 40, having a core member 41 with a primary winding 42 thereon, adapted to be energized from an alternating current source, and a secondary winding 43 disposed in connection with a rectifier 45 of any desirable type. The rectifier 45 may be connected with a field pole winding for providing auxiliary excitation thereof, being, for example, disposed in connection with the series-field windings 17 and 19, and the commutating field windings 21 and 23 of the generator through a reversing switch 24, or possibly connected to an independent excitation winding. The switch 24 may be of any desirable construction, for effecting a ready reversal of the direction of the excitation current supplied to the excitation winding, thereby reversing the terminal polarity of the generator at the operator's will.

In accordance with the general construction of cross-field generators, it may be seen that magnetic shunt members 51 and 53 of the generator 10 may be provided with short-circuiting damper windings 54 and 55, respectively, and disposed in connection with the shoe portion 27 of the field pole member 15 by means such as bolt members 56 which pass through the shunt members and are secured in threaded engagement with the shoe portion 27. Springs 57, may be positioned upon the bolt members 56 for resiliently biasing the shunt members 51 and 53 into engagement with the shoe portion 27, yet permitting their adjustment relative to the shoe portion 25 of the field pole member 13, by means of a threaded shaft 58, which is disposed to engage extended portions 59 and 60 of the shunt members 51 and 53, respectively.

Referring to Fig. 2, it may be seen that in an alternative form of my invention, the shoe portions 63 and 65 of field pole members may be provided with arcuate surfaces adjacent to the armature 12 and parallel to the surface thereof, but comprising portions 67, 68 and 70, 71, respectively, of different radii. Air gaps 73, 74 and 75, 86, respectively, which are parallel, but of different lengths are thereby provided to effect an increase of air gap reluctance in the direction of armature rotation, and cooperate with the increased field winding excitation to effect polarity control of a cross field generator 10 without undue increase of the no-load armature current.

For a complete understanding of the nature of my invention, it must be realized that in a generator of the cross-field type, as shown in Fig. 1, there will be a circulating current $i$ flowing between the auxiliary brushes 35 when the generator is running without load. Inasmuch as this current is induced by the conductors on the armature cutting the residual magnetic flux of the field pole members 13 and 14, the path of which is indicated by the dotted line φ—1, it will be understood that in providing auxiliary polarity determining excitation for a field pole winding, there would normally be an increase of the flux φ—1 due to the increased excitation, and, therefore, an increased no-load circulating current in the armature. While auxiliary polarity control excitation of a field pole winding has been found essential in order to prevent accidental reversal, and permit ready reversal at will of the terminal polarity of a generator of the cross-field type, it has been found that the increase incurred thereby in the no-load armature circulating current has in many instances been so great as to produce excessive sparking of the auxiliary brushes 35 at no-load and substantially reduce the stability of the generator under load. By adapting shoe members 25 and 27 to provide air gaps 29 and 30, respectively, which have increased reluctance from the leading shoe tip to the trailing tip, as indicated in the figures of the accompanying drawing, I have found that it is possible to provide auxiliary excitation of the field pole windings of a generator of the cross-field type and thereby readily determine and control the terminal polarity of the generator, yet not appreciably increase the no-load circulating current of the armature. In this manner, excessive sparking at the auxiliary brushes and wear of the commutator are prevented, and the stability of the generator is markedly improved under load conditions.

Since certain changes may be made in the above construction, and different embodiments of the invention may be made without departing from the spirit thereof, it is intended that all matter contained in the above description or shown in the accompanying drawing, shall be taken as descriptive, and not in a limiting sense.

I claim as my invention:

1. The combination in a generator of the cross-field type, of an armature having main and auxiliary brushes, circuit means connecting the auxiliary brushes to provide a closed armature circuit for producing a cross-field flux, field pole members having field windings positioned thereon, auxiliary polarity control means including a source of excitation and switch means for selectively connecting the source to at least one of the field pole windings to control the polarity of the residual magnetism of the field pole member, and an arcuate pole shoe member positioned between each field pole member and the armature having the surface portions adjacent the armature so positioned relative thereto as to provide air gaps therebetween of varying reluctance to prevent any increase in the no-load air gap flux without affecting the value of the cross-field flux.

2. The combination in a generator of the cross-field type having a pair of oppositely positioned field pole members provided with field windings, an armature rotatably positioned therebetween having main and auxiliary brushes, circuit means connecting the auxiliary brushes to provide an armature circuit for producing a cross-field flux, of means including an independent source and reversible switch means for supplying an auxiliary polarity controlling potential to at least one of the said field windings for determining the direction of the no-load magnetomotive force of the field pole members, and arcuate shoe members associated with the field pole members to provide a low reluctance path therethrough for a cross-field flux the surface portions of the shoe members adjacent the armature being so related thereto as to provide air gaps therebetween of increasing reluctance in the direction of armature rotation so as to prevent the auxiliary polarity controlling potential from increasing the no-load air gap flux, without altering the reluctance of the path of the cross-field flux.

3. A generator of the cross-field type comprising, a pair of field pole members having field windings thereon, an armature having main and auxiliary brushes, circuit means connecting the auxiliary brushes to provide an armature circuit for producing a cross-field flux, means including an external source and a switch for selectively connecting the source to at least one of the field windings to control the no-load terminal polarity of the generator by controlling the no-load magnetomotive force of the field pole members, and arcuate shoe members disposed on the field pole members to provide a low reluctance path for the cross-field flux therethrough having the surface portion thereof adjacent the armature positioned relative thereto to provide air gaps of decreased reluctance at the leading tip and increased reluctance at the trailing tip so as to substantially neutralize the effect of the increased field pole magnetomotive force on the no-load air gap flux.

4. In a generator of the cross-field type, the combination, of a rotatable armature having main and auxiliary brushes, circuit means connecting the auxiliary brushes to provide an armature circuit for a cross magnetizing armature current, a plurality of field pole members associated with the armature comprising main body portions and shoe portions disposed adjacent to the armature to provide an air gap therebetween of increased reluctance in the direction of armature rotation, a plurality of field pole windings disposed on said field pole members and connected in series circuit relation with the main brushes, and means including a separate source and a switch for providing for selective auxiliary excitation of at least one of said field pole windings to control the polarity of the no-load magnetic flux of the body member of a field pole member, the variation in air gap reluctance being disposed to limit the no-load magnetic flux of the body member of the field pole member to prevent an increase in the no-load circulating armature current.

5. The combination in a generator of the cross-field type, of a rotatable armature having main and auxiliary brushes, circuit means connecting the auxiliary brushes, a plurality of field pole members having main body portions and shoe portions adjacent to the armature to provide air gaps therebetween of increased reluctance at the trailing portion and decreased reluctance at the leading portion of a pole shoe from the normal value of air gap reluctance, a plurality of windings associated with the field pole members, and means including a separate source and a reversible switch selectively applying an auxiliary polarity controlling potential to at least one of said windings, the shoe portions of the field pole members being so shaped that the variation in air gap reluctance between the armature and a field pole member is disposed to substantially prevent any effective increase in the no-load air gap flux resulting from the application of the auxiliary polarity controlling potential to the field winding.

WILLIAM R. HARDING.